Oct. 11, 1966      G. L. MOUTRAY      3,277,781

TRI-FOLD REAR PROJECTION SCREEN

Filed June 17, 1965

GUILFORD L. MOUTRAY
*INVENTOR.*

BY

*Robert K. Rhea*
AGENT

United States Patent Office 3,277,781
Patented Oct. 11, 1966

3,277,781
TRI-FOLD REAR PROJECTION SCREEN
Guilford L. Moutray, 2433 NW. 36th Terrace,
Oklahoma City, Okla.
Filed June 17, 1965, Ser. No. 464,772
3 Claims. (Cl. 88—28.91)

The present invention is a continuation-in-part of an application filed by me in the United States Patent Office on March 14, 1963, under Serial No. 265,144, for Tri-Fold Rear Projection Screen, now Patent No. 3,191,492.

The present invention relates to picture projectors and more particularly to a portable rear projection screen.

Rear projection or daylight screens are not new but most of those presently available comprise a bulky frame and stand which is difficult to move from one location to another and occupy considerable storage space when not in use. Furthermore, the conventional rear projection screen, because of its size and supporting components, is relatively expensive and is not acceptable for use by persons requiring a lightweight inexpensive screen for home use or by traveling salesmen.

This invention is an improvement over the above referred to application by eliminating the box-like housing and interconnecting three panels forming the screen by upper and lower fabric members.

It is, therefore, the principal object of the instant invention to provide a lightweight portable rear projection screen which may be folded to define a compact relatively thin rectangular unit comparable in size to a thin briefcase.

Another object is to provide a screen of this class which may be readily and easily assembled for motion picture or transparent slide projection and which may be folded into a compact unit for storage or traveling.

Another object is to provide a rear projection screen of the folding type which is substantially triangular in shape when viewed from the top or bottom.

A further object is to provide a rear projection screen wherein the reflecting member is formed of unbreakable lightweight material.

Yet another object is to provide a rear projection screen wherein all members are hingedly connected to a single back wall or panel and fold toward the back wall in overlapping relation.

The present invention accomplishes these and other objects by hingedly connecting a screen carrying frame and cooperating closure members to a back wall or panel.

Figure 1:
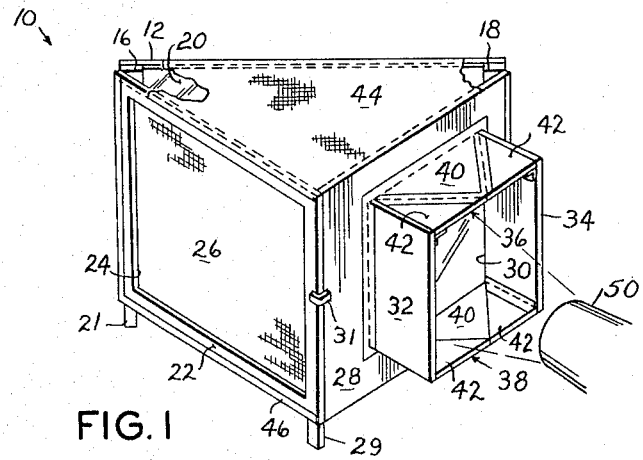
Figure 2:
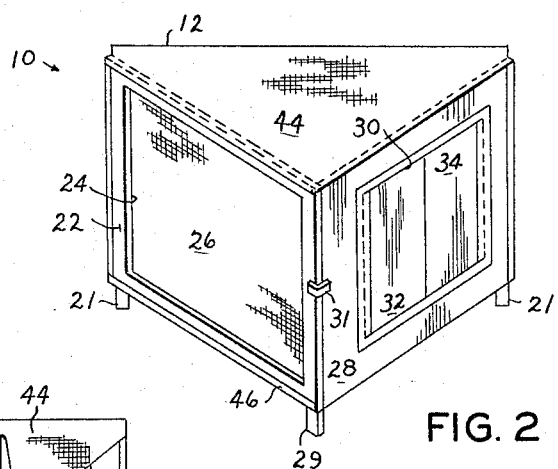
Figure 3:
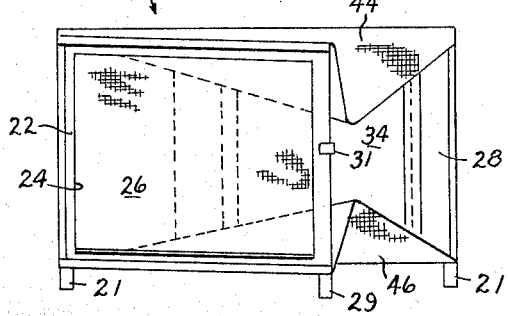
Figure 4:
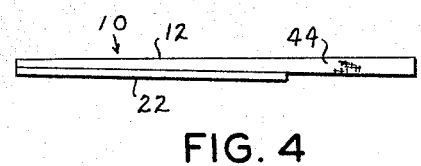

Other objects will be apparent from the following description when taken in conjunction with the accompanying single sheet of drawings, wherein:

FIGURE 1 is a perspective view of the device in operative positon;
FIGURE 2 is a view similar to FIG. 1 illustrating the image beam light shield doors in closed position;
FIGURE 3 is a perspective view of the device when in collapsed position; and,
FIGURE 4 is a top edge view of FIG. 3.

Like characters of reference designate like parts in those figures of the drawings in which they occur.

In the drawings:

The reference numeral 10 indicates the device, as a whole, which is triangular in general configuration when in operative positon and panel-like when collapsed for carrying or storage.

The device 10 includes a generally rectangular relatively thin back wall 12 having a pair of relatively narrow spacers 16 and 18 transversely secured to one side surface of its respective end portions. A reflecting surface, such as a japanned or ferrotype plate 20, is flatly secured to the surface of the back wall 12 between the spacers 16 and 18. A pair of relatively short supporting legs 21 are secured to one side of the wall 12 at its respective ends.

A rectangular frame 22 is hingedly connected by one of its ends to the spacer 16 and adjacent end of the back wall 12 for swinging movement of the frame 22 toward and away from the ferrotype plate 20. The frame 22 is shorter than the length of the back wall 12 and transversely is of equal dimension with respect to the transverse width of the back wall. A similar cooperating support leg 29 is secured to the side of the frame 22 adjacent its free end edge. The screen frame 22 is provided with a rectangular opening 24 and a lens or screen 26 extends tautly across and is secured to the respective sides of the frame. The screen 26 is preferably formed of transparent flexible vinyl material having one surface coated with a material presently marketed under the trade name Polacoat which comprises a translucent material containing minute glass particles or beads which reveal the details of an image projected onto the screen.

A rectangular door-like front wall 28, transversely of equal dimension with respect to the back wall 12, is hingedly connected at one end of the spacer 18 and adjacent end of the back wall 12. The front wall 28 is shorter than the length of the back wall 12, and when hinged outwardly from the ferrotype plate 20, its free end edge abuts the adjacent outer end side surface of the screen frame (FIGS. 1 and 2). A latch or stop 31 prevents movement of the free end edge of the front wall outwardly from the free side edge surface of the screen frame 22. The front wall 28 is provided with a substantially square opening 30. A pair of rectangular panels or doors 32 and 34 are respectively hingedly connected by one side edge to the edge of the front wall 28 defining the vertical side edges of the opening 30 as viewed in FIGS. 1 and 2.

As shown in FIG. 2, when the doors 32 and 34 are pivoted toward each other their free side edges lie in abutting relation and within the plane defined by the front wall 28 to close the opening 30. Upper and lower panel-like folding flaps 36 and 38 are hingedly connected to the respective upper and lower ends of the doors 32 and 34 and to the edge of the front wall 28 defining the upper and lower limits of the opening 30 as viewed in FIGS. 1 and 2. Each of the flaps 36 and 38 are formed by a relatively thin central triangular-shaped member 40 having its base side edge secured to the front wall 28, as described hereinabove, and a pair of right triangular-shaped members 42, secured by the base edge surface to the respective upper and lower edges of the pair of doors 32 and 34. The respective hypotenuse side edge of the members 42 is hingedly connected to the respective side edge of the central triangular-shaped member 40 so that, when the pair of doors 32 and 34 are pivoted inwardly to close the opening 30, the panel-like flaps 36 and 38 fold inwardly upon themselves, respectively, and are disposed adjacent the plane of the inner surface of the front wall 28 (FIG. 2). Thus it may be seen that the purpose of the spacers 16 and 18 permits the front wall 28 to be pivoted toward the ferrotype plate 20 with the folded panels 36 and 38 contacting the surface thereof.

A pair of substantially isosceles triangular-shaped members 44 and 46, preferably formed of flexible light shielding material, such as black-out cloth, are secured by their base side edge portion to the respective side edges of the back wall 12. One cooperating side edge of the members 44 and 46 is secured to the respective side edge surface of the screen frame 22. The other side edge of the respective member 44 and 46 coincides with and overlies the respective upper and lower side edge surface of the front wall 28, thus forming a closed projection booth having an image beam admitting opening when in operating position (FIG. 1). The purpose of the doors 32 and 34 and the cooperating flaps 36 and 38 is to exclude substantially all light from the interior of the device except the image beam or light from the projector indicated at 50.

When the device is not in use, the doors 32 and 34 are closed, as shown in FIG. 2, and the front wall 28 is pivoted toward the ferrotype plate 20. Thereafter the screen frame 22 is pivoted toward the back wall wherein the members 44 and 46 fold inwardly, as shown in FIG. 3, to overlie the front wall 28 while the screen frame overlies the folded members 44 and 46 to form a relatively thin rectangular-shaped device when collapsed.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A daylight rear projection folding screen for receiving an image from a projector, comprising: a rectangular back wall; a ferrotype plate flatly secured to one surface of said back wall; a screen frame hingedly connected to one end of said back wall; an image reflecting screen extending across said frame; a front wall hingedly connected to the other end of said back wall, the free edge surfaces of said frame and said front wall coinciding in a common plane when pivoted outwardly from said back wall, said front wall having a central image beam passing opening; image beam light shielding means comprising side doors interconnected with upper and lower folding panels secured to said front wall around the opening; and triangular-shaped flexible members secured by respective side edges to respective side edges of said back wall and said frame and meeting, at their other respective side edge, the respective side edge of said front wall when said frame and said front wall are pivoted outwardly in free edge meeting position.

2. A daylight rear projection folding screen for receiving an image from a projector, comprising: a rectangular back wall; a ferrotype plate flatly secured to one surface of said back wall; a rectangular open frame hingedly connected by one of its ends to one end of said back wall for swinging movement toward and away from said ferrotype plate; an image reflecting screen extending across the open portion of said frame; a rectangular front wall hingedly connected by one of its ends to the other end of said back wall for swinging movement toward and away from said ferrotype plate and the adjacent free end edge of said frame, said front wall having an image admitting opening; image beam light shielding means comprising said doors interconnected at their respective ends with upper and lower folding panels secured to the outer surface of said front wall around the opening for opening and closing the latter; and triangular-shaped members secured by respective side edges to respective side edge surfaces of said back wall and said frame and overlying, at their other side edge surfaces of said front wall when said frame and said front wall are pivoted outwardly from said ferrotype plate.

3. A daylight rear projection folding screen for receiving an image from a projector, comprising: a rectangular back wall; a relatively narrow spacer transversely secured to one side of said back wall adjacent its respective ends; a ferrotype reflecting plate secured to said back wall between said spacers; a rectangular open screen frame hingedly connected by one of its ends to one said spacer for swinging movement toward and away from said ferrotype plate; a flexible screen extending tautly across and secured to the respective four sides of said frame; a rectangular front wall hingedly connected by one of its sides to the other said spacer for swinging movement toward and away from said ferrotype plate, said front wall having a central image admitting rectangular opening; a pair of doors hingedly connected vertically to opposing walls forming the sides of said opening and closing the latter when said doors are pivoted toward each other in free edge abutting relation; upper and lower folding flaps connected respectively with opposite end portions of said pair of doors and the upper and lower walls defining the respective upper and lower edge of the opening, each said flap including three triangular-shaped hingedly interconnected members forming a rectangular panel when in opened position, said pair of doors and said upper and lower flaps projecting outwardly, when in opened position, normal to the outer surface of said front wall to form a light shield in cooperation with said opening for passing a picture image beam; and a pair of triangular-shaped members formed of flexible material, each said triangular-shaped member being secured by its base edge portion to the respective side of said back wall and secured by one side edge portion to the respective opposing side surfaces of said screen frame and overlying at its other side edge, the respective upper and lower edge surface of said front wall when said screen frame and said front wall are pivoted outwardly from said back wall defining a triangular-shaped closed projection booth.

References Cited by the Examiner

UNITED STATES PATENTS

| | | | |
|---|---|---|---|
| 1,283,590 | 11/1918 | Stavenhagen | 88—28.91 X |
| 2,062,878 | 12/1936 | Hammel | 88—28.91 |

JULIA E. COINER, *Primary Examiner.*